United States Patent [19]

Matey et al.

[11] Patent Number: 4,758,728

[45] Date of Patent: Jul. 19, 1988

[54] METHOD OF MEASURING MASK MISREGISTRY IN KINESCOPE PANEL ASSEMBLIES

[75] Inventors: James R. Matey, Hamilton Township, Mercer County; David P. Bortfeld, Kendall Park, both of N.J.

[73] Assignee: RCA Licensing Corporation, Princeton, N.J.

[21] Appl. No.: 813,149

[22] Filed: Dec. 24, 1985

[51] Int. Cl.[4] ........................ H01J 9/42; G01N 21/64

[52] U.S. Cl. .............................. 250/459.1; 250/461.1; 445/63

[58] Field of Search .......................... 250/459.1, 461.1; 356/154; 354/1; 445/63

[56] References Cited

U.S. PATENT DOCUMENTS

| | | | |
|---|---|---|---|
| 3,514,208 | 5/1970 | Levin | 445/63 |
| 4,001,877 | 1/1977 | Simpson | 358/10 |
| 4,286,164 | 8/1981 | Ragland, Jr. | 250/461.1 |
| 4,525,735 | 6/1985 | Krufka | 358/10 |
| 4,584,481 | 4/1986 | Matey | 250/459.1 |

*Primary Examiner*—Carolyn E. Fields

*Attorney, Agent, or Firm*—E. M. Whitacre; D. H. Irlbeck; L. L. Hallacher

[57] ABSTRACT

The misregistration of kinescope panel assemblies is measured by passing UV through the shadow mask to the phosphor screen. The lighthouse optics are set for exposure of one of the three phosphor colors, such as green. The intensity of light emanating from the panel is measured for a plurality of locations on the screen, and for a plurality of incremental positions of the panel assembly with respect to the lighthouse light source. The position of maximum intensity of light emanating from the panel is recorded and used to calculate the misregistration between the phosphor screen and the shadow mask.

7 Claims, 2 Drawing Sheets

METHOD OF MEASURING MASK MISREGISTRY IN KINESCOPE PANEL ASSEMBLIES

BACKGROUND

This invention relates generally to the production of kinescopes for color television receivers and particularly to a method for measuring mask misregistry in the panel assemblies for such kinescopes.

The picture tube, or kinescope, for a color television receiver is manufactured by permanently coupling a funnel portion to a panel assembly. The funnel portion supports an electron gun which provides the electron beams needed to produce the color visual display. The panel assembly includes a phosphor screen and a shadow mask. The phosphor screen is composed of triads of phosphors each of which emits a different color of light when impacted by electrons. The shadow mask is spaced a predetermined distance, commonly called the Q spacing, from the screen. The shadow mask includes a large number of apertures through which the electron beams pass prior to reaching the phosphor screen. The apertures cause the electron beams from the individually modulated electron guns to impact phosphors of the proper light emitting color. The screen can also include a black matrix material which is used to separate the phosphors to improve the color purity of the visual output. The distance between the shadow mask and the electron guns therefore is important. This distance is commonly called the $\overline{P}$ distance. Basic geometry readily shows that a change in either the Q spacing, the $\overline{P}$ distance, or the lateral position of the mask relative to the phosphor screen, will cause a shift in the landing positions of the electron beams relative to the desired landing positions on the dots or lines of the phosphor screen. Such shifts in the landing positions cause a defect in the final product which is commonly referred to as misregister.

The phosphor screen is produced by coating the entire internal surface of the faceplate panel with a slurry containing a phosphor and a photosensitive material which sets upon exposure to light. After the slurry is applied, the shadow mask is inserted into the panel and the panel assembly is placed on an illumination mechanism, commonly called a lighthouse. The lighthouse includes an illumination source, typically a mercury vapor lamp, which is spaced the $\overline{P}$ distance from the shadow mask. Light from the illumination source passes through a lensing system of the lighthouse, and, through the apertures in the shadow mask to expose the slurry on the faceplate panel. The lensing system is used to cause the light to follow essentially the same paths that the electron beams follow during the operation of the kinescope. Accordingly, when the phosphor being exposed is the green light emitting phosphor, the lensing system is arranged to simulate the path of the green electron beam of the finished kinescope. Similarly, when the red or blue light emitting phosphor is being exposed, the lensing system is adjusted so that the light path simulates the path of the red or blue electron beam. The lighthouse optical system lighthouse includes a trimmer mechanism which includes a trimmer lens for each of the three colors of light emitting phosphors. The lighthouse optical system thus causes the light to simulate the path of the red, green or blue electron beams, depending on the adjustment of the trimmer mechanism.

During exposure, the phosphor slurry which receives light through the apertures is set, while that which is shaded by the metal portions between the apertures is not. For many types of panels, during exposure the panel assembly is moved so that continuous phosphor lines are formed. The shadow mask is removed from the panel and the unexposed slurry is washed away leaving the exposed phosphor in the desired areas. A photosensitive slurry containing another of the three phosphors is applied to the entire inside surface of the panel and the shadow mask reinserted. The trimmer mechanism is adjusted for the second color slurry and the exposure process repeated. Thus, the shadow mask is repeatedly inserted into, and removed from the panel. Also, for black matrix types of kinescopes, additional insertion and removal of the shadow mask is required.

The relative positions of the phosphors and the shadow mask apertures is commonly called registry. Thus, for a panel assembly having proper registry, the relative positions of the three color phosphors and the shadow mask apertures are aligned so that the individual electron beams impact the phosphors which emit the desired color of light. When the phosphors and the shadow mask apertures are misregistered, the centers of the electron beams will not coincide with the centers of their respective phosphor dots or stripes. Portions of the beam will therefor land on the guard bands surrounding the phosphor dots or stripes. The guard bands do not contain phosphor, and usually are filled with a black matrix material. Accordingly, the portion of the beam landing on the guard band will not produce fluorescence. Regions of the panel in which this occurs are darker than properly registered regions. If the misregister is great enough, portions of the electron beam can spill past the guard bands onto an adjacent phosphor. Regions of the panel in which this occurs have incorrect coloration. Both of these effects are objectional and typically result in the rejection of the kinescope.

Misregister can be measured in terms of the size and sign of the misregister, that is, an effective lateral displacement of the shadow mask relative to the panel. Misregister can also be measured in regard to the area of the panel over which the misregister occurs. The severity of a misregister defect is dependent on both of these factors. A small area, small magnitude defect may not be noticable by the end user, while either a small area, large magnitude or a large area, small magnitude defect might be easily seen. Small area defects are typically called local defects, and are usually caused by localized damage to the shadow mask. Large area defects are typically called global defects. These defects are generally caused by a shift, or rotation, of the shadow mask relative to the phosphor screen, or by a warp or bend of the mask as a whole.

The production of the phosphor screen on a faceplate panel is among the early processing steps in the production of a completed kinescope. Accordingly, a large number of expensive steps are carried out subsequent to the production of the phosphor screen. The detection of misregistry in a completed tube results in the scrapping of a very expensive tube. For these reasons, the detection of misregistry prior to joining the panel assembly and the funnel assembly together is very important.

A very effective method for detecting local misregistry is described in copending application Ser. No. 671,128 entitled "Method of Testing A Panel Assembly of a Cathode Ray Tube" filed Nov. 13, 1984 by James R. Matey. With this method, the trimmer lens for one of the three colors is replaced by an ultraviolet filter which is transparent to ultraviolet, but opaque to visible light. A completed panel assembly is exposed through the ultraviolet filter. When the panel registry is correct the ultraviolet light passes through the shadow mask and impacts the phosphor of the desired color, and the phosphor fluoresces with that color. When a large local misregistry condition, such as a dent, exists, the UV impacts the wrong phosphor and a change of color in misregistered areas results. This change of color is easily detectable by visual inspection.

The method described in the referenced copending application is very effective in detecting local misregister large enough to cause incorrect coloration. It is less effective in detecting global misregister, or small amounts of local misregister. As noted above, small amounts of misregister can cause an intensity variation, rather than a color variation. These intensity variations are much more difficult to detect by eye than the color variations for several reasons. The color shift is from one definite color to another, for example, from green to red or blue. The observer needs only to make a qualitative judgement. Evaluation of intensity variations requires a quantitative judgement. Additionally, most panels have an aluminum coating applied over the phosphors. Light from the phosphors which would go out the back of the tube is reflected toward the front of the tube. When inspecting such aluminized panels using the techniques described herein and in the referenced copending application, reliance is placed on some fraction of the UV light being able to penetrate the aluminum and reach the underlying phosphor. The aluminum coating is typically non-uniform and therefore different amounts of UV penetrate the aluminum, thereby causing intensity variations in the resulting fluorescence. Such variations are not related to misregister. The electron beams are much more penetrating than the UV light and the non-uniformity in the aluminization therefore has little, or no, detrimental effect on a finished tube.

For these reasons there is a need for a method for measuring misregistry in a kinescope panel assembly independent of human observation. The present invention fulfills this need.

SUMMARY

A method of measuring misregistration between the shadow mask and phosphor screen of a cathode ray tube panel assembly includes the steps of illuminating the phosphor screen, through the shadow mask with illumination composed primarily of ultraviolet light and detecting the illumination emanating from the panel at a plurality of preselected locations. Incremental relative motion between the panel assembly and the illumination source causes the preselected locations to be different for each increment of motion. The intensity of the detected illumination is measured at each of the preselected locations to provide measured intensity readings for each increment of motion and the position of the panel is sensed to provide position data for each increment of motion. The measured intensity readings and the position data are fitted to a model intensity curve to identify the position at which the peak intensity occurs. Misregistration between the shadow mask and the phosphor screen is calculated in accordance with the position of the peak intensity on the fitting curve.

DETAILED DESCRIPTION

Figure 1:
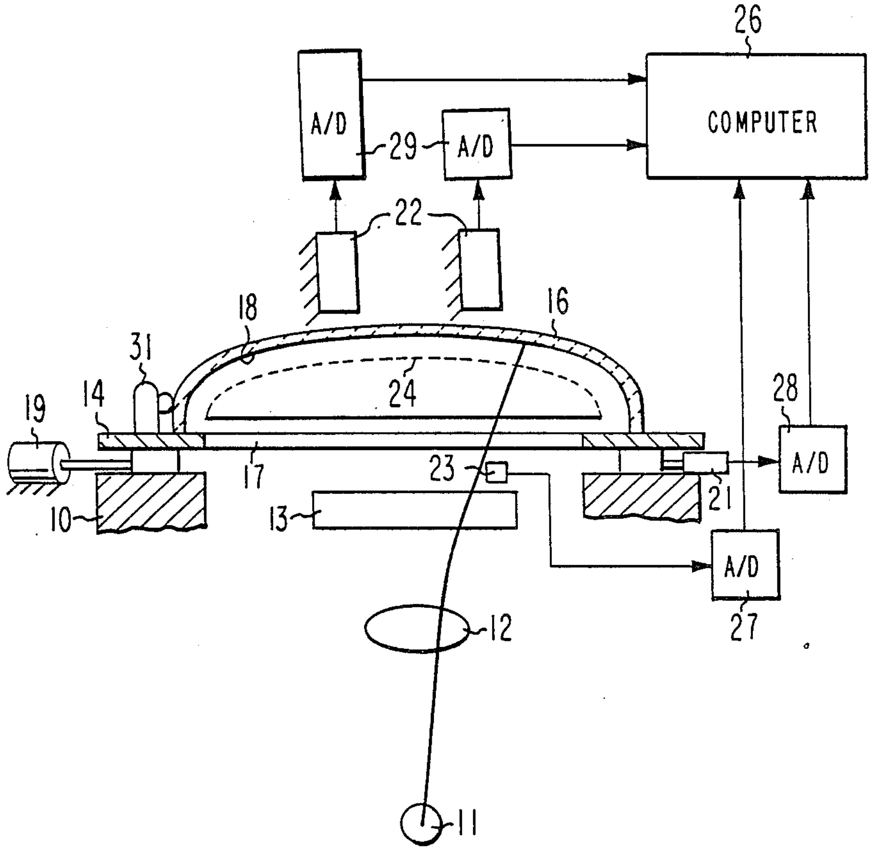
FIG. 1 is a simplified showing of a kinescope panel assembly and a lighthouse modified to perform the present invention.

In FIG. 1, an illumination mechanism 10, such as a lighthouse, includes a main lens 12 and an illumination source 11, typically a mercury lamp. The lighthouse 10 also includes an ultraviolet filter 13, such as that described in copending U.S. application Ser. No. 671,128, in place of the usual green trimmer lens. The lighthouse 10 includes a movable platform 14 which supports a cathode ray tube panel assembly 16. The platform 14 includes an aperture 17 through which the phosphor screen 18 of the panel assembly 16 is exposed to light emanating from the illumination source 11 through the lens 12 and the ultraviolet filter 13. The lamp 11 is spaced the $\overline{P}$ spacing from the mask 24. A motor 19 is used to move the platform 14 on which the panel assembly 16 rests, and thus the phosphor screen 18, relative to the light source 11. This motion is perpendicular to the motion of the panel assembly during the screening process.

A position sensor 21, typically in the form of a linear voltage differential transformer (LVDT), is used to measure the position of the platform 14 with respect to a zero position. The zero position is the position at which the platform would be located on the lighthouse at the commencement of the screening operation. Referencing members 31 (only one is shown) are permanently affixed to the lighthouse 10 and are used to accurately position the panel assembly 16 on the platform 14. A plurality of sensors 22 is arranged to receive light emanating from the panel 16. The sensors 22 are arranged at any desired locations with respect to the panel 16, and the number of sensors used is dependent upon the number of measurements to be taken for each panel assembly. The lighthouse 10, and the lensing system are shown in simplified form because lighthouses are well known to those skilled in the art and the details therefore are not required herein.

An ultraviolet sensor 23 is arranged between the UV filter 13 and the screen 18. The sensor 23 detects the intensity of the ultraviolet energy emanating from the filter 13 before the energy passes through the shadow mask 24, which is mounted in the panel assembly 16.

The outputs of the various sensors are provided to a computer 26 through A/D converters. Thus, the output of the sensor 23 is applied to the computer 26 through A/D 27. Similarly, the output of the position sensor 21 is provided to the computer 26 through an A/D 28. The outputs of the various sensors 22 also are applied to the computer 26 through appropriate A/D's 29.

The invention is predicated upon the fact that the maximum intensity of ultraviolet light will impact the proper phosphor through the apertures of the shadow mask 24 when the shadow mask and phosphor screen 18 are in optimum registration. Accordingly, misregistration can be measured by incrementally moving the panel 16, in a direction perpendicular to the direction of motion during the formation of the phosphor lines, and noting the position at which maximum intensity is detected. Therefore, in carrying out the inventive method, the panel assembly 16 is placed upon the lighthouse 10 in the same orientation as that used to expose the phosphor lines. The panel assembly 16 is placed against guide members 31 to accurately position the panel assembly on the moveable platform 14. The platform 14 is then placed at the zero position of the lighthouse 10. This position maximizes ultraviolet light transmitted to the phosphor through the shadow mask apertures for acceptably registered shadow masks and phosphor screens.

After the panel assembly 16 is positioned and oriented at the zero position the motor 19 is actuated and the platform 14 moves from the zero position to a start position. The panel assembly 16 is incrementally moved from the start position toward, and through, the initial zero position. At the end of each increment of motion intensity readings are taken from the light sensors 22 and 23, and position readings are taken from the position sensor 21. These readings are recorded for every position. The intensity and position readings are then fitted to an intensity/position curve which best fits the type of panel assembly being measured. Thus, the intensity/position curve is established for each panel type using panels which are known to possess optimum registration. The algorithm which defines the peak fitting curve can be quadratic, cubic, quartic or sine depending upon the characteristics of the panel assembly. The fitting curve shows the position at which the peak intensity occurs for acceptably registered panel assemblies, typically this is the zero position on the lighthouse 10. Misregistration causes the peak intensity to shift to a different position along the curve. The total shift of the peak intensity, therefore, is a measure of the misregistration between the shadow mask 24 and the phosphor screen. The actual misregistration can be calculated using the intensity shift and panel assemblies having excessive misregistration rejected.

Figure 2:
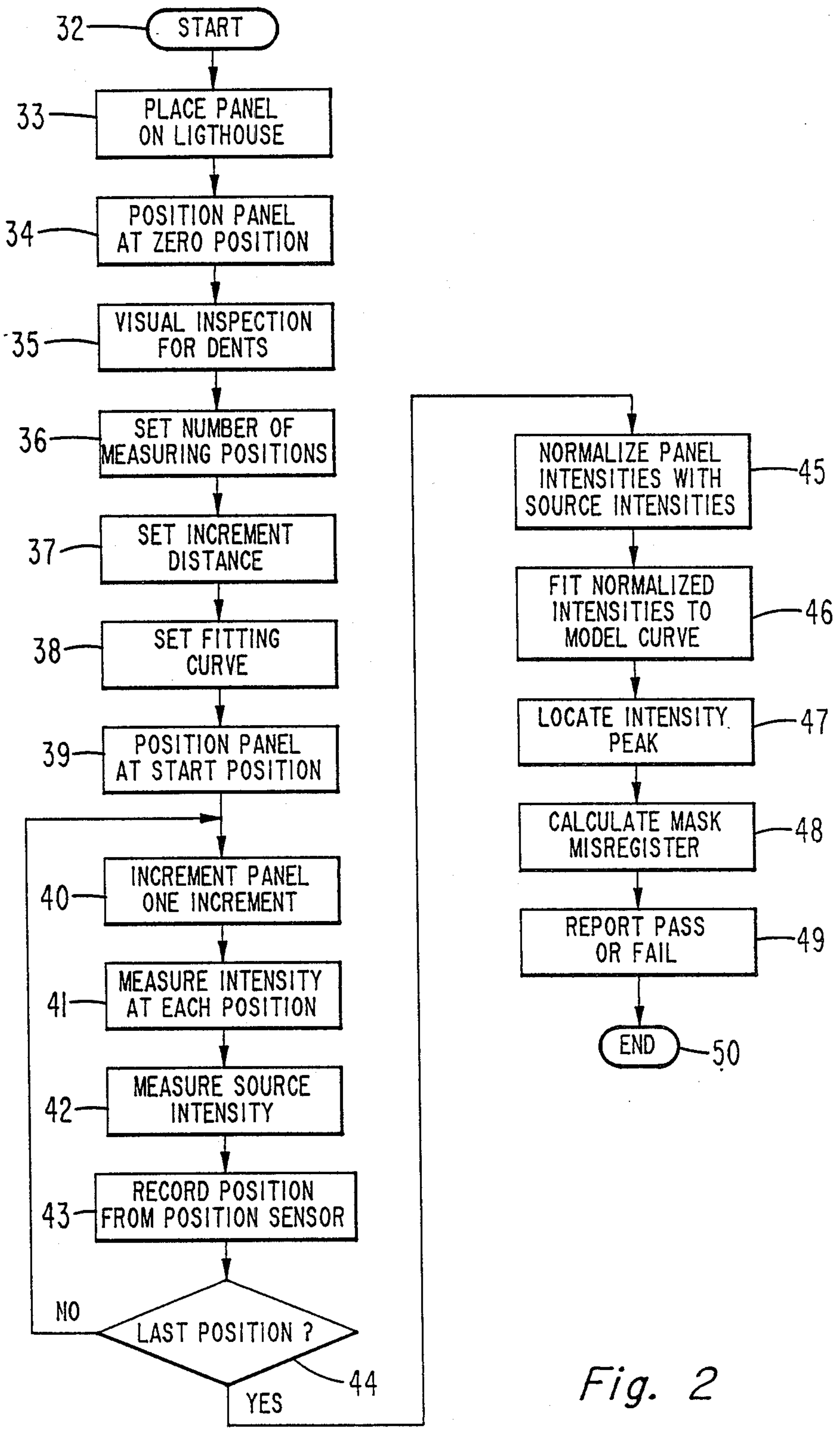
FIG. 2 is a preferred embodiment of the present invention.

FIG. 2 is a flow chart of a preferred embodiment of the inventive method. The method starts at 32 and at steps 33 and 34 the panel assembly 16 is placed onto the lighthouse 10 at the zero position defined by the reference members 31. At step 35, a visual inspection for dents can be performed. The details of such a visual inspection are presented in copending application Ser. No. 671,128, fully referenced hereinabove. At step 36, the number of measuring positions, or incremental steps, is set, and at step 37 the distance of each increment is set. At step 38, the mathematical definition of the fitting curve is set into the system. This is the fitting curve previously chosen by measuring the intensities, at each incremental position, of idealized panels for the various types of panel assemblies. A fitting curve which has been found useful with a variety of panel types is:

$$\text{Intensity}=A+B\sin(kx)+C\cos(kx)$$

where:

A, B and C are fitting parameters established by the characteristics of the panel assembly being tested.

k is a spatial wavelength, which also can be measured or calculated for each particular tube type.

x is the incremental position for each measurement.

At step 39 the panel assembly 16 is moved from the initial zero position to the start position. This motion is perpendicular to the phosphor lines of the screen. At step 40, the panel assembly is incremented one increment toward the zero position. At step 41, the intensity, at each of the measuring positions defined by the locations of the intensity sensors 22, is measured and recorded. Simultaneously, at step 42 the illuminating intensity of the ultraviolet emanations from the UV filter 13 and is detected by the sensor 23 and recorded. Also, at each position the position reading from the position sensor 21 is taken and recorded. After all the intensity and the position sensors are read, decision 44 is entered to determine whether or not all of the incremental steps set into the system at step 36 has been taken. When all the steps have not been taken, step 40 is reentered to increment the panel another of the incremental steps, and all sensors are read and the measurements recorded.

After all the incremental steps have been completed and all the intensity and position sensors read, step 45 is entered to normalize the panel intensities with the source intensity. Such normalization can be done by dividing all of the intensity readings from the detectors 22 by the source intensity reading from the sensor 23 for each incremental step. Step 46 is entered to fit the normalized intensities to the intensity/position fitting curve set into the system at step 38. Step 47 is entered to locate the position at which the peak intensity occurred. Step 48 is used to calculate the actual mask misregistration. The misregistration is calculated by multiplying the position x, at which the peak intensity reading occurred, by $Q/(\bar{P}+Q)$ where:

Q is the Q spacing between the shadow mask 24 and the screen 18

$\bar{P}$ is the distance between the light source 11 and the shadow mask 24.

Some misregistry is permissible and is to be expected. Thus, for example, 0.07 mils misregistration can be acceptable, while a greater value results in a failure. Step 49 is utilized to determine whether or not the calculated misregistration exceeds the permissible misregistration and a pass or failure is reported. The method ends at step 50 and another panel assembly can be placed upon the lighthouse and the process repeated.

The number of measuring positions, the distance of each incremental step between the positions, and the spatial wavelength k are all factors which have an important bearing on the success of the algorithm.

The range spanned by the measuring positions should be chosen so that, for the range of misregister which will be measured, the peak of the intensity will occur within the range spanned by the positions. The number of measuring positions must be at least as large as the number of parameters in the fitting curve. For any fitting curve, the precision with which the curve peak can be determined will generally increase with the number of measuring points. On the other hand, additional points require additional time for measurement and computation. There is a natural tradeoff here which must be evaluated experimentally for each application.

The spatial wavelength k, is a factor which is particular to the sine wave algorithm. It can be determined experimentally by measuring intensity versus position over a range large enough to assure that two minima or two maxima are obtained. Let λ be the distance between the two maxima (minima) then:

$$k=2\pi/\lambda.$$

λ can also be determined from the geometry of the shadow mask and phosphor screen, the Q-spacing and the Q distance as explained in chapter 5 of "Color Television Picture Tubes", by A. M. Morrell, H. B. Law, E. G. Ramberg, and E. W. Herold (Academic Press, New York, 1974).

What is claimed is:

1. A method of measuring misregistration between the shadow mask and phosphor screen of a cathode ray tube panel assembly comprising the steps of:

placing said panel assembly on an illumination mechanism including an illumination source;

illuminating said phosphor screen, through said shadow mask with illumination composed primarily of ultraviolet light;

detecting illumination emanating from said panel at a plurality of preselected locations of said panel;

effecting incremental relative motion between said panel assembly and said illumination source, wherein said preselected locations are incrementally different for each increment of said motion;

measuring the intensity of the detected illumination at each of said preselected locations to provide measured intensity readings for each increment of motion;

sensing the position of said panel to provide position data for each increment of said motion;

fitting said measured intensity readings and said position data to a model intensity curve and finding the position at which the peak intensity occurs; and calculating misregistration between said shadow mask and said phosphor screen in accordance with said peak intensity.

2. The method of claim 1 further including the step of detecting the intensity of the illumination to said shadow mask to provide an illuminating intensity reading, and using said illuminating intensity reading to normalize said measured intensity readings.

3. The method of claim 2 further including the step of initially placing said panel at a zero position, and displacing said panel to a start position arranged at a preselected distance, and in a selected direction, from said zero position, prior to detecting illumination passing through said panel, wherein said incremental relative motion is effected in a direction opposite to said selected direction and carries said panel past said zero position.

4. The method of claim 3 wherein said model intensity curve is defined by the expression $$I=A+B\sin(kx)+C\cos(kx)\text{ where:}$$

I=Intensity

A,B & C are fitting functions determined by the characteristics of the panel being measured k is a spatial frequency determined by the characteristics of the panel being measured x is the position reading.

5. The method of claim 4 wherein misregistration is calculated by the expression $$MR=xQ/(\overline{P}+Q)$$

where:

MR is the misregistration x is the incremental position of the panel

Q is the spacing between said shadow mask and said phosphor screen $\overline{P}$ is the distance between said shadow mask and said illumination source.

6. The method of claim 3 wherein said phosphor screen is a line screen and wherein said relative motion is normal to said line screen.

7. The method of claim 5 wherein said phosphor screen is a line screen and wherein said relative motion is normal to said line screen.

* * * * *